May 15, 1951  C. L. HALL ET AL  2,552,782
NUT FASTENER
Filed Dec. 22, 1948
FIG. 1.
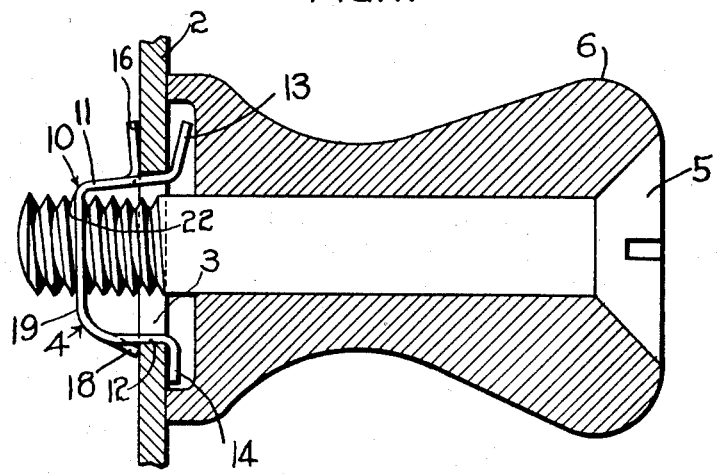
FIG. 2.
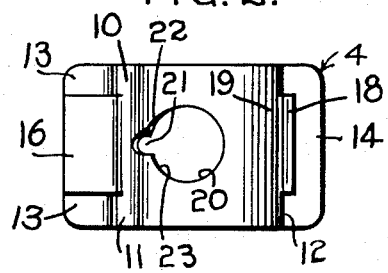
FIG. 4.  FIG. 3.  FIG. 5.
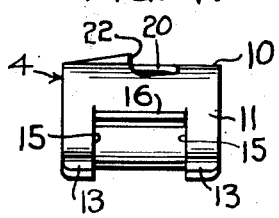 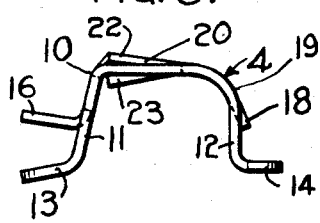 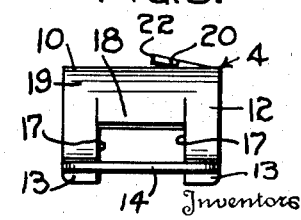
Inventors
CHARLES L. HALL
LLOYD G. PENDER
By John Todd
Attorney Patented May 15, 1951

2,552,782

UNITED STATES PATENT OFFICE 2,552,782

NUT FASTENER

Charles L. Hall and Lloyd G. Pender, Detroit, Mich., assignors to United-Carr Fastener Corporation, Cambridge, Mass., a corporation of Massachusetts Application December 22, 1948, Serial No. 66,656

2 Claims. (Cl. 85—36)

This invention relates to nut fastenings for blind installations and the like, and aims generally to improve such nut fastening devices adapted for snap attachment to an apertured support such as the inner wall of a refrigerator or like device.

It is an object of the invention to provide an improved nut fastening which can readily be assembled and installed with a minimum of time, effort and equipment.

It is a further object of the invention to provide an improved nut fastening which can be readily mounted in an apertured support from one side thereof when the other side of the apertured support is inaccessible.

It is a still further object of the invention to provide an improved snap fastening formed of sheet metal which can be readily attached to a refrigerator lining after assembly to serve as a shelf support for refrigerator shelves.

It is another object of the invention to provide an improved snap fastener member adapted to be inserted and held by an apertured support.

These and other objects and advantages of the invention will be apparent to persons skilled in the art to which the invention relates from a consideration of the accompanying drawings and annexed specification illustrating and describing a preferred embodiment of the invention.

In the drawings:

Fig. 1 is a sectional view of a fragment of an apertured support with the nut-fastened installation attached thereto;

Fig. 2 is a plan view of the nut fastening according to a preferred form of the invention;

Fig. 3 is a side elevation of the nut member shown in Fig. 2;

Fig. 4 is an end elevation of the nut member shown in Fig. 3, as viewed from the left hand side thereof; and Fig. 5 is an end elevation of the nut member as viewed from the opposite side thereof.

Referring to the drawings, the improved installation comprises a nut member 4 adapted for snap fastened engagement with a support 2 provided with an aperture 3 therein which may be of suitable shape, preferably square. The support 2 may be of any desired type, for example a sheet metal refrigerator wall or like blind installation having only one accessible side from which the nut member as well as the stud or supported member may be applied. The nut member 4 is adapted to receive a threaded end of a stud or screw 5 supporting a member 6 which may be a sleeve or the like such as a refrigerator shelf support, the particular details of construction of which are not essential to the present invention.

According to the invention, the nut member 4 is shaped to fit within a square or other suitably shaped aperture 3 in the support to be secured and non-rotatably held against rotation therein. Preferably, the nut member is formed from an elongated strip of sheet material and shaped to general U-shaped form providing a bight or body portion 10, generally conforming to the the shape of the opening 3 and opposed leg or side portions 11 and 12, each having outwardly turned terminal ends as at 13 and 14, respectively.

The leg 11 may be slitted, as at 15, inwardly of the side edges from its terminal end toward the body or bight portion to provide an intermediate tongue 16 which may be bent outward from the leg and at substantially right angles thereto and spaced from the end 13, so as to provide with said outwardly bent terminal end 13 opposed support-engaging members adapted to engage opposite sides of the support 3 as illustrated in Fig. 1.

The opposite leg 12 may be similarly slotted as at 17 to provide an intermediate outwardly bent snap fastener shoulder 18 spaced from the adjacent terminal end 14 and adapted for snap fastener engagement with an opposite or inaccessible face of the support 2 as illustrated in Fig. 1.

In assembling the nut 4 in an apertured support the support-engaging members 13 and 16 are first engaged with opposite sides of the support and the opposite side of the nut then pushed into the aperture of the support until the resilient support-engaging member 18 snaps outwardly against the rear face of the support. Additional movement of the nut through the aperture 3 is prevented by the end 14 and the nut is firmly anchored in the apertured support, rotation being prevented by the square aperture 3 of the support and the cooperating straight side edge of the nut. Although the illustrated construction of the support-engaging members 13, 14, 16 and 18 is preferred, many variations thereof will occur to one skilled in the art and are contemplated as within the purview of the invention.

If desired, the edge between the body or bight portion and the adjoining leg 12 may be well rounded to provide an arcuate cam surface 19 adapted to engage an edge of the support aperture and flex the leg portion 12 inwardly toward the leg 11 as the nut is pushed into the aperture 3.

The nut member 4 is provided with a stud-receiving opening, and preferably this is formed in the body or bight portion 10. As illustrated, the body or bight portion 10 is provided with a circular opening 20 having radial reentrant recesses 21 permitting the lateral distortion in opposite directions of the circular aperture walls 22—23 on opposite sides of a diameter extended through the recess 21 to form a helically shaped thread for engagement in a threaded groove of a screw threaded portion of the stud 5.

In assembling the device to a support, an aperture of the desired shape, usually square, is made in the support, and the snap nut 4 is then inserted and pressed into position as previously described. The stud 5 is then inserted through the aperture 3 of the support 2 and threadedly engaged with the helical thread by rotation in a conventional manner.

It will thus be seen that the present invention provides a nut fastening which is economical, simple and readily installed in an apertured support without the use of special tools. It will be understood that minor changes in the size, form and construction of the various parts of the improved nut fastening shown and described herein will occur to one skilled in the art and may be made without departing from the spirit of the invention, the scope of which is set forth in the appended claims.

We claim:

1. A fastener nut adapted to be mounted in an apertured support comprising a generally U-shaped member having a centrally apertured bight portion provided with thread-groove-engaging means and opposed leg portions, the terminal ends of each of said leg portions being outwardly bent to provide support-engaging portions adapted to engage a surface of a support and limit movement of the nut through an aperture thereof, said leg portions being slotted intermediate the side edges thereof, said slotted portions being outwardly turned to provide support-engaging members adapted to engage an opposite face of such a support, said bight aperture being positioned closely adjacent one of said leg portions, the support-engaging member of said other leg portion being adapted to be forced inwardly when the body portion is inserted in such an apertured support and to snap outwardly when the body portion is seated so as to lock it in position in the support, said other leg portion being connected to said bight portion by an enlarged camming portion providing a camming surface adapted to facilitate contracting of said leg portions as the nut is forced through a support aperture.

2. A fastener nut in accordance with claim 1 wherein the marginal edges of the bight aperture are helically shaped to provide said thread-groove-engaging means.

CHARLES L. HALL.
LLOYD G. PENDER.

REFERENCES CITED

The following references are of record in the file of this patent:

UNITED STATES PATENTS

| Number | Name | Date |
| --- | --- | --- |
| 2,244,823 | Burke | June 10, 1941 |
| 2,251,643 | Tinnerman | Aug. 5, 1941 |